United States Patent [19]

Blakey

[11] Patent Number: 4,755,540
[45] Date of Patent: Jul. 5, 1988

[54] POLYMER MEMBRANE

[75] Inventor: Susan V. Blakey, Reading, England

[73] Assignee: Raychem Limited, Swindon, England

[21] Appl. No.: 736,484

[22] Filed: May 20, 1985

[30] Foreign Application Priority Data

May 18, 1984 [GB] United Kingdom ............ 8412673

[51] Int. Cl.$^4$ ............................................. C08J 9/26
[52] U.S. Cl. ....................................... 521/62; 204/252;
204/296; 521/61; 521/149
[58] Field of Search .................. 204/252, 296; 521/62,
521/61, 149

[56] References Cited

U.S. PATENT DOCUMENTS

| 3,930,979 | 1/1976 | Vallance .......................... 204/296 |
| 4,098,672 | 7/1978 | Riley ............................... 204/296 |
| 4,311,566 | 1/1982 | McCann ........................... 204/296 |
| 4,341,619 | 7/1982 | Couper et al. .................... 204/296 |

FOREIGN PATENT DOCUMENTS

| 2300144 | 9/1976 | France . |
| 0106243 | 8/1980 | Japan . |
| 1213739 | 11/1970 | United Kingdom . |
| 1449644 | 9/1976 | United Kingdom . |
| 1506665 | 4/1978 | United Kingdom . |

OTHER PUBLICATIONS

McGraw-Hill, *Encyclopedia of Chemistry*, 1983, "Poly-- Sulfone Resins", p. 818.
Chem. Abs. 87:191234h (1977) Abstract of Yuasa Battery, JP77-10,824 (1977).

*Primary Examiner*—John F. Niebling
*Assistant Examiner*—Kathryn Rubino
*Attorney, Agent, or Firm*—Yuan Chao; Edith A. Rice; Herbert G. Burkard

[57] ABSTRACT

Porous membranes of aromatic polymer (preferably ether ketone) are prepared with pore size and surface area allowing use in place of asbestos membranes in hot alkaline electrolysis cells. The membranes are prepared by solvent extraction of a polymer which is "partially incompatible" with the aromatic from a blend of the two. The membranes are preferably dried in the presence of a surfactant to enhance re-wetting in use.

8 Claims, 2 Drawing Sheets

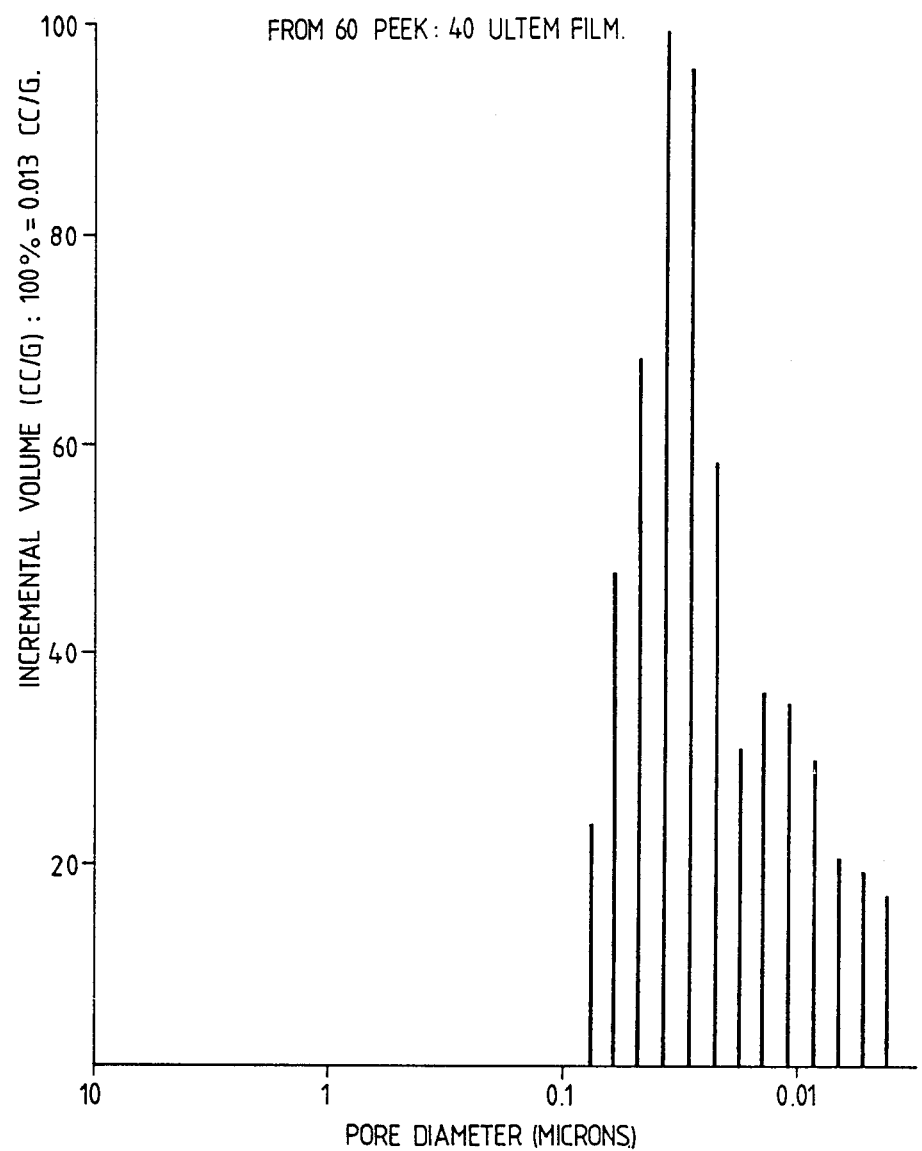

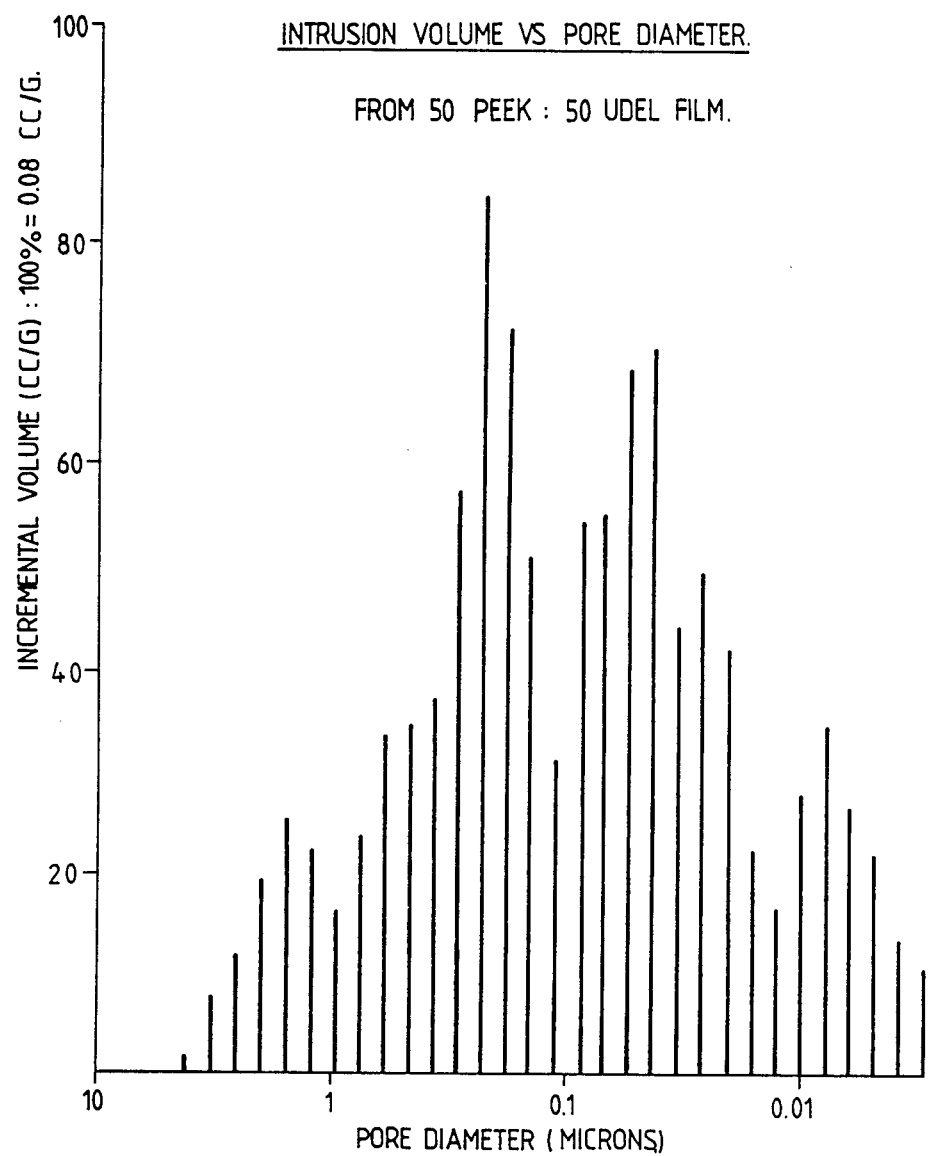

POLYMER MEMBRANE

This invention relates to polymer membranes, especially membranes which are suitable for use as diaphragms in electrochemical cells.

Diaphragms for electrochemical cells are usually required to resist, preferably prevent, free passage of gases while permitting conduction by virtue of their porous structure. Particularly vigorous conditions are encountered by such diaphragms in alkaline electrolysis of water to produce hydrogen, for which purpose chrysoasbestos diaphragms are normally used operating at about 80° C. in 20–30 weight % potassium hydroxide. In order to improve efficiency a higher operating temperature of greater than 100° C., preferably 120° C., is desirable the asbestos has limited chemical resistance under these conditions. Silica dissolution results in pollution of the electrolyte and a reduction in gas barrier performance until failure through large holes results. Although the lifetime of asbestos can be improved by including silicate ions in the electrolyte or by reinforcing with nickel, its poor mechanical stability requires the use of thick (ca 0.2 mm) diaphragms with consequently high resistances. Furthermore there is a desire to replace asbestos for environmental reasons.

Porous diaphragms fabricated from fibers of organic polymers, although preferable for environmental reasons, tend to have significant drawbacks relative to the conventional asbestos diaphragm. Because of their hydrophobic nature, very small pore diameters or fiber diameters are required to preclude bulk gas passage. The low surface energy of these materials can cause incomplete wetting of the separator interstices. Hence a balance of pore size and wettability is required to achieve the desired diaphragm properties.

The low wettability problem can be overcome using a chemical modification e.g. radiochemical grafting, or sulphonation, or by including an inorganic filler. However such modifications tend to be unstable in hot alkali and may result in thick diaphragms with undesirably high resistances in order to achieve adequate strength.

The present invention makes possible inter alia the replacement of thick asbestos diaphragms with thin (0.1–0.2 mm) porous polymeric membranes having excellent gas barrier and good electrolyte transport properties, and improved resistance to the conditions encountered in service.

One aspect of the invention accordingly provides a porous membrane comprising a substantially uniform mixture of (a) aromatic ether ketone polymer material and (b) another polymer material which is partially incompatible with the ether ketone polymer material, from which mixture at least a substantial part (e.g. at least 80%, preferably at least 90%, most preferably at least 95%, by weight) of the other polymer material (b) has been solvent extracted.

The invention also provides a new kind of alkaline electrolysis membrane comprising a film of a substantially uniform mixture of (a) aromatic polymer material and (b) another polymer material which is partially incompatible with the aromatic polymer material, from which film at least a substantial part of the other polymer material (b) has been solvent extracted.

The preferred aromatic polymer material for these electrolysis membranes is an aromatic ether ketone polymer and the preferred "other" polymer material is also aromatic, preferably an aromatic ether sulphone polymer.

It has been found in accordance with another aspect of this invention that aromatic polymer membranes having at least 40%, preferably at least 60%, of their pore volume, as determined by mercury intrusion porosimetry, in pores of mean diameter within the range from 0.1 to 5 micrometers, preferably within the range from 0.1 to 3 micrometers, provide surprisingly good performance in alkaline electrolysis. A highly advantageous balance of electrical resistance, gas bubbling pressure and service life at operating temperatures above 100° C. for electrolysis of caustic alkali solution of at least 20%, preferably at least 40%, concentration by weight has been achieved by some embodiments of this invention.

The technique of mercury intrusion porosimetry is described by H. M. Rootare under the title "A Review of Mercury Porosimetry" in "Advanced Experimental Techniques in Powder Metallurgy" (Perspect. Powder Met. (1970) 225–252 (Plenum Press)).

The invention also provides a method of preparing a porous membrane comprising blending an aromatic polymer (a) with another polymer (b) which is partially incompatible with the aromatic polymer and is soluble in a liquid which does not dissolve the aromatic polymer, and (b) extracting the other polymer (b) from the aromatic polymer (a) by means of the said liquid.

It has been found that the partially incompatible "other" polymer can be selected to provide partially incompatible blends (PIB) in which the respective polymers have adequate processing (preferably melt extrusion) and temperature compatibility and the level of incompatibility is selectable by simple trial and error to produce membranes having the pore volume/pore diameter characteristics specified above. These membranes are potentially useful for many purposes, and are very suitable for hot alkaline electrolysis cells since they do not suffer from problems of embrittlement which may affect membranes made by extraction of more completely ("molecularly") compatible "other" polymers from molecularly compatible blends (MCB). The term "partially incompatible" is thus used herein to describe extractable "other" polymers which, while sufficiently compatible with the membrane aromatic polymer to enable a substantially homogeneous film of the PIB to be formed, preferably by melt extrusion, are not completely molecularly compatible therewith and thus do not form true MCB's. The membranes of the present invention tend to have a somewhat fibrillated structure and may therefore have relatively low tensile strength in one or more directions. Lack of strength may be compensated for by the membrane carrying reinforcing fibers, e.g. a web or net of polymer, and/or by laminating together two or more such membranes having a directionally oriented lack of strength with their low-strength directions differently aligned, (provided that the total thickness is not so great as to interfere unacceptably with the end use performance of the membrane), and/or by heat sealing the membrane, preferably in an open grid pattern to provide strengthened seal lines with interspersed areas of unsealed membrane having the original porosity and performance characteristics.

Preferably less than 40%, more preferably less than 20%, most preferably less than 10%, of the membrane surface area will be sealed to provide such a strengthening seal pattern, for example using lines of less than 2 millimeters width, more preferably less than 1 millimeter width, to seal a pattern of squares, diamonds or triangles having, for example, 1 centimeter side lengths. Alternatively, or in addition, the membrane may be sealed around its edges.

Useful proportions of starting materials in parts by weight are, for example:

|  | Preferred | Most Preferred |
|---|---|---|
| Membrane aromatic polymer: | 45–70 | 45–55 |
| Partially incompatible polymer: | 55–30 | 55–45 |

Substantial removal of the partially compatible "other" polymer means that the final membrane contains no more than 20%, preferably no more than 10%, most preferably no more than 5%, by weight of residual "other" polymer.

It will be understood that references to aromatic polymers mean polymers which have aromatic groups incorporated in the repeating unit of their backbone chain, not merely appended as side groups to the chain as for example in the case of polystyrene. Preferably the aromatic polymers will have no two adjacent aliphatic carbon atoms in the repeating unit.

Preferred aromatic polymers are the poly(aryl ether) resins which may be described as linear, thermoplastic polyarylene polyethers wherein the arylene units are interspersed with ether, sulfone or ketone linkages. These resins may be obtained by reaction of an alkali metal double salt of a dihydric phenol and a dihalobenzenoid or dinitrobenzenoid compound, either or both of which contain a sulfone or a ketone linkage, i.e. —SO₂— or —CO—, between arylene groupings, to provide sulfone or ketone units in the polymer chain in addition to arylene units and ether units. Such aromatic polyethers are included within the class of polyarylene polyether resins described in U.S. Pat. No. 3,264,536.

The polyarylene polyethers are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction but the unique facility of these solvents to promote the reaction to a high molecular weight product has now provided the critical tool necessary to secure sufficiently high molecular weight aromatic ether products useful for services heretofore limited to such products as polyformaldehydes and polycarbonates.

The polymers are also prepared in a two-step process in which a dihydric phenol is first converted in situ in the primary reaction solvent to the alkali metal salt by the reaction with the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol is admixed and reacted with about stoichiometric quantities of the dihalobenzenoid or dinitrobenzenoid compound.

The polymerization reaction proceeds in the liquid phase of a sulfoxide or sulfone organic solvent at elevated temperatures.

In order to secure the high polymers, the system should be substantially anhydrous, and preferably with less than 0.5 percent by weight water in the reaction mixtures.

The term "aromatic ether ketone polymer" or "polyaryletherketone" is used herein to include the polymers with interspersed ether and ketone groups including arrangements such as ether ketone, ether ether ketone, ether ketone ketone, ether ether ketone ketone, ether ketone ether ketone ketone, and others. By analogy, the term "aromatic ether sulphone polymer" or "polyarylethersulphone" will be understood to include the polymers with interspersed ether and sulphone groups in arrangements analogous to those mentioned for the ketones above. Polyarylene sulphides such as "RYTON" (Trade Mark) are also among the preferred polymers for the present membranes.

The polyaryletherketones may be better defined as polymers having the repeat unit of the formula —CO—Ar—CO—Ar'— wherein Ar and Ar' are aromatic moieties at least one of which containing a diaryl ether linkage forming part of the polymer backbone and wherein both Ar and Ar' are covalently linked to the carbonyl groups through aromatic carbon atoms.

Preferably, Ar and Ar' are independently selected from subsituted and unsubstituted phenylene and substituted and unsubstituted polynuclear aromatic moieties. The term polynuclear aromatic moieties is used to mean aromatic moieties. The term polynuclear aromatic moieties is used to mean aromatic moieties containing at least two aromatic rings. The rings can be fused, joined by a direct bond or by a linking-group. Such linking groups include for example, carbonyl ether sulfone, sulfide, amide, imide, azo, alkylene, perfluoroalkylene and the like. As mentioned above, at least one of Ar and Ar' contains a diaryl ether linkage.

The phenylene and polynuclear aromatic moieties can contain substituents on the aromatic rings. These substituents should not inhibit or otherwise interfere with the polymerization reaction to any significant extent. Such substituents include, for example, phenyl, halogen, nitro, cyano, alkyl, 2-alkynyl and the like.

Poly(aryl ether ketones) having the following repeat units (the simplest repeat unit being designated for a given polymer) are preferred:

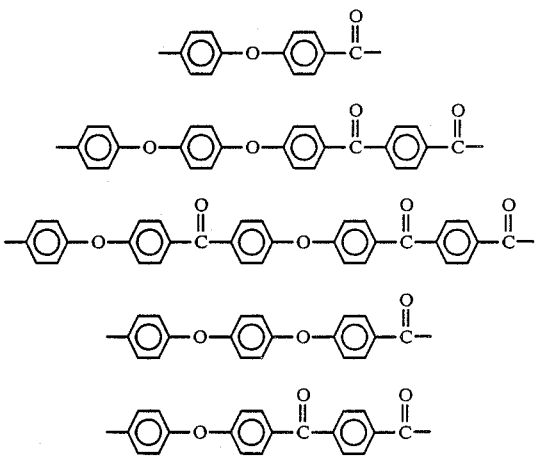

Poly(aryl ether ketones) can be prepared by known methods of synthesis. Preferred poly(aryl ether ketones)

can be prepared by Friedel-Crafts polymerization of a monomer system comprising:

(I) phosgene or an aromatic diacid dihalide together with (II) a polynuclear aromatic comonomer comprising:
(a) H—Ar"—O—Ar"—H
(b) H—(Ar"—O)$_n$—Ar"—H wherein n is 2 or 3
(c) H—Ar"—O—Ar"—(CO—Ar"—O—Ar")$_m$—H wherein m is 1, 2 or 3 or
(d) H—(Ar"—O)n—Ar"—CO—Ar(O—Ar")$_m$—H wherein m is 1, 2 or 3, and n is 2 or 3 or (II) an acid halide of the formula:
H—Ar"—O—[(Ar"—CO)$_p$—(Ar"—O)$_q$—(Ar'-'—CO)$_r$]$_k$—Ar"—CO—Z wherein Z is halogen, k is 0, 1 or 2, p is 1 or 2, q is 0, 1 or 2 and r is 1, 1 or 2; or (III) an acid halide of the formula:
H—(Ar"—O)n—Ar"—Y wherein n is 2 or 3 and Y is CO—Z or CO—Ar"—CO—Z where Z is halogen; wherein each Ar" is independently selected from subsituted or unsubstituted phenylene, and substituted and unsubstituted polynuclear aromatic moieties free of ketone carbonyl or ether oxygen groups, in the presence of a reaction medium comprising:

(A) A Lewis acid in an amount of one equivalent per equivalent of carbonyl groups present, plus one equivalent per equivalent of Lewis base, plus an amount effective to act as a catalyst for the polymerization;

(B) a Lewis base in an amount from 0 to about 4 equivalents per equivalent of acid halide groups present in the monomer system; and (C) a non-protic diluent in an amount from 0 to about 93% by weight, based on the weight of the total reaction mixture.

The aromatic diacid dihalide employed is preferably a dichloride or dibromide. Illustrative diacid dihalides which can be used include for example

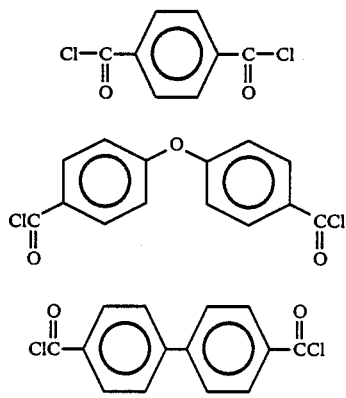

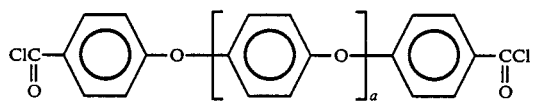

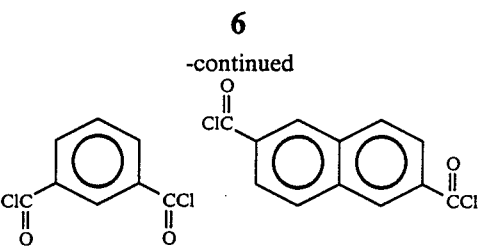

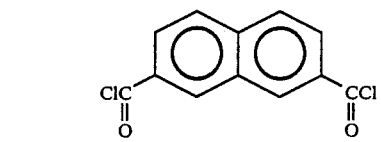

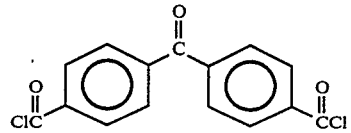

wherein a is 0 to 4.

Illustrated polynuclear aromatic comonomers which can be used with such diacid halides are:

(a) H—Ar"—O—Ar"—H, which includes, for example:

(b) H—(Ar"—O)n—Ar"—H, which include, for example:

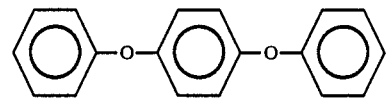

and

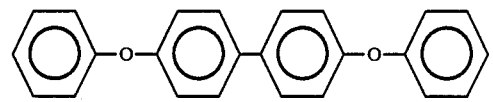

(c) H—Ar"—O—Ar"—(CO—Ar"—O—Ar")$_m$—H, which includes, for example:

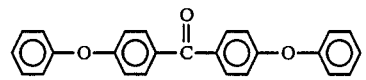

and
(d) H—(Ar"—O)n—Ar"—CO—Ar"—(O—AR")$_m$—H which includes, for example:

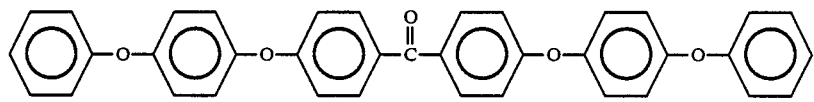

Monomer systems II and III comprise an acid halide. (The term acid halide is used herein to refer to a mono-acid monohalide.) In monomer system II, the acid halide is of the formula:

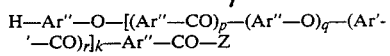

Such monomers include for example, where k=0

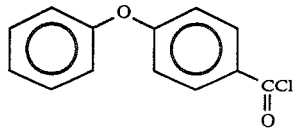

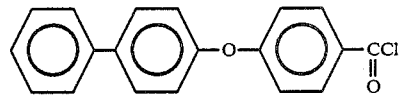

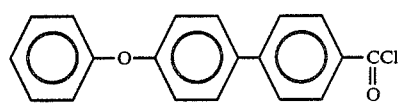

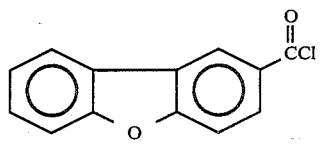

and where k = 1

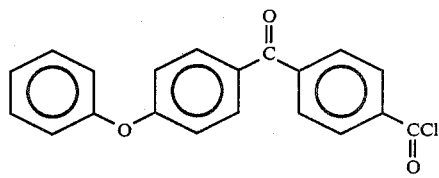

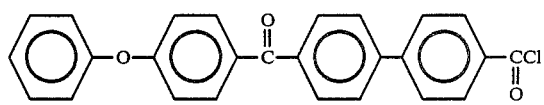

In monomer system III, the acid halide is of the formula

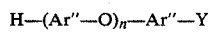

Examples of such acid halides include

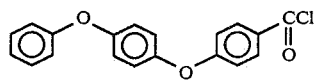

and

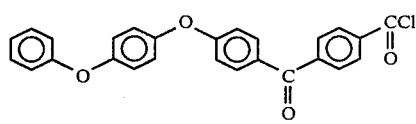

It is to be understood that combinations of monomers can be employed. For example, one or more diacid dihalides can be used with one or more poly-nuclear aromatic comonomers as long as the correct stoichiometry is maintained. Further, one or more acid halides can be included. In addition monomers which contain other linkages such as those specified above, can be employed as long as one or more of the comonomers used contains at least one ether oxygen linkage. Such comonomers include for example:

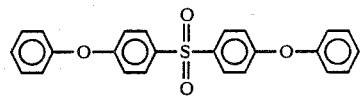

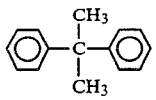

which can be used as the sole comonomer with an ether containing diacid dihalide or with phosgene or any diacid dihalide when used in addition to a polynuclear aromatic comonomer as defined in I(ii)(a), I(ii)(b), I(ii)(c) or I(ii)(d). Similarly

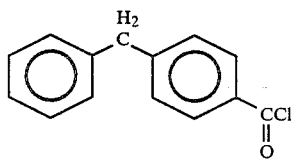

can be used as a comonomer together with an ether-polynuclear aromatic acid halide or as an additional comonomer together with a monomer system as defined in I.

The monomer system can also contain up to about 30 mole % of a comonomer such as a sulfonyl choride which polymerizes under Friedel-Crafts conditions to provide ketone/sulfone copolymers.

Further details of this process for producing poly(aryl ether ketones) can be found in our published British Application No. 2138433.

The extractable "other" polymer(s) will preferably also be aromatic polymers, although non-aromatic polymers may also be used if suitable degrees of compatibility are determined, and if they are melt processable at the temperatures required for the aromatic polymer.

It has been found that the aforementioned membranes prepared by solvent extraction of MCB's such as polyaryletheretherketone (PEEK): polyetherimide blends have a pore size distribution determined by using mercury intrusion porosimetry (using the "Autopore 9200" instrument supplied by Micrometrics Instrument Corp., of Norcross, Ga., U.S.A.) as shown in FIG. 1 of the accompanying drawings. These were found to have excellent gas barrier and electrolyte transport properties, the gas barrier performance being determined by measuring a limiting bubbling pressure value (ASTM F316). The resulting PEEK membranes had limiting bubbling pressure values of >50 kPa (>500 mbar) compared to 3 kPa (30 mbar) for an asbestos diaphragm (2 mm thick, made by FERLAM). In addition this high value did not depend on the PEEK diaphragm being swollen with water. This is of great advantage in the cell, avoiding the need for edge reinforcement to prevent gas leakage in the cell, which is necessary for asbestos, as disclosed in European Patent Specification No. EP 86146. Electrolyte transport properties were measured using a cell consisting of parallel stainless steel electrodes 1 cm apart and 2 cm in diameter in a PTFE body. The cell was filled with electrolyte and resistance measurements taken in the presence ($R_T$) and absence ($R_E$) of the diaphragm between the electrodes.

The membrane resistance $R_M = R_T - R_E$ ohms. Values are expressed as "equivalent thickness of electrolyte" i.e. $(R_M \times d)/R_E$ where d is the electrode separation. The PEEK membranes had equivalent thickness values of 0.1–2 millimeters (in 1M KOH at 25° C.) compared with 2–3 millimeters for the asbestos.

In spite of the demonstrated chemical stability of PEEK in 40% KOH at 120° C. it was found that these PEEK MCB membranes became embrittled rapidly in the hot alkali. Surprisingly membranes made from PIB's such as PEEK with an aromatic polysulphone (UDEL, Union Carbide) did not become embrittled under the same conditions. Inherent viscosity measurements indicated that PEEK membranes prepared from MCB's as aforesaid showed molecular weight reduction of the PEEK in hot alkali, whereas the PEEK/UDEL PIB membranes did not.

The above PEEK/UDEL PIB membranes displayed a typical pore size distribution as shown in FIG. 2 of the accompanying drawings. The gas barrier and electrolyte transport properties are dependent on thickness, pore volume, and process history but values of 20–40 kPa (200–400 mbar) have been obtained for limiting bubbling pressure with resistance values of 0.5–2 mm. These values are again excellent for the alkaline electrolysis application.

Preferably, the membranes will be dried after the extraction step for convenient handling, and thus drying will preferably be performed in the presence of a surfactant to enhance re-wetting of the membrane in use. The choice of surfactant is not critical, suitable examples including cetyltrimethylammonium bromide and Teepol (Trade Mark).

The two types of membrane (MCB and PIB) differ in several ways, one or more of which may account for the different behaviour in hot alkali, without necessarily limiting the scope of the present invention.

The PEEK/ULTEM MCB membranes are slightly opaque in appearance. They are mesoporous as shown by mercury intrusion porosimetry (FIG. 1) but no clear structure can be seen using scanning electron microscopy (S.E.M.). In contrast the white opaque PEEK/UDEL PIB membranes have a wide pore size range more typical of a paper (FIG. 2). S.E.M. clearly shows fine fibers (fibrillar material) after the extraction step, with the fibrils of the fibrillar material substantially all aligned in a single direction. The surface areas of the two types (determined using nitrogen by the B.E.T. method on a Quantachrome system) are ca.100 and 25 square meters per gram respectively.

The different physical properties of the two types are illustrated by critical strain and tensile strength measurements on microtensile specimens (based on ASTM D1708). The specimens were pulled at 1 mm/minute.

| | TYPE | | | |
|---|---|---|---|---|
| | 60:40 PEEK/ULTEM (0.05 mm thick) | | 50:50 PEEK/UDEL (0.2 mm thick) | |
| PROPERTY | MD | TD | MD | TD |
| Critical strain (%) | 9.58 | 12.27 | 9.61 | 9.43 |
| Tensile strength (MPa) | 59.13 | 41.52 | 5.03 | 0.26 |

MD = machine direction : TD = transverse direction

PEEK/ULTEM samples discolour and embrittle rapidly in hot alkali, a drop in molecular weight (by inherent viscosity) being observed after only 100 hours in 40 weight % KOH at 120° C. Samples of PEEK/UDEL still showed no change in properties or drop in molecular weight after 1000 hours.

Some specific examples of the preparation of the membranes in question will be be described to illustrate the invention.

EXAMPLE 1

A mixture of 50 wt % VICTREX PEEK (Trade Mark) 38P powder from I.C.I. and 50 wt % UDEL (Trade Mark) P1800 powder from Union Carbide was compounded on a Baker-Perkins twin screw extruder. A double pass route was used with a temperature profile of 360° C.–380° C. Blown film (0.05–0.08 mm thick and 200 mm wide) was made by extruding the blend through a Baughn single screw extruder and a Betol film tower. The membrane was then prepared by refluxing the film in dimethylformamide (DMF) for 19 hours. After a DMF rinse the membrane was boiled for 1½ hours in distilled water to remove residual solvent. This gave a white fibrillar film. The properties of the wet sample were, a bubbling pressure of >200 mbar (not tested to destruction) and a resistivity value, E.T. of 1.5 mm (of 1M KOH at 25° C.). The dried membrane had a pore size distribution typical of a paper as shown in FIG. 2.

EXAMPLE 2

A membrane as prepared in Example 1 was dried out in the presence of a surfactant, cetyltrimethylammonium bromide (i.e. from a 0.1% aqueous solution). The sample rewetted immediately in 1M KOH, giving a resistivity value of 1.6 mm. In comparison a sample dried without surfactant took several days to rewet. The dried sample (0.2 mm thick) had tensile strengths of 5.03 and 0.26 MPa in the machine and transverse directions respectively.

EXAMPLE 3

A membrane diaphragm as prepared in Example 1 was exposed to 40 weight % KOH at 120% for 1000 hours (in a 750 ml PTFE lined Berghof autoclave). The bubbling pressure and resistivity values were >200 mbar (not tested to destruction) and 1.2 mm respectively. The sample was flexible with no discolouration and no molecular weight decrease was observed (as determined by inherent viscosity measurement).

EXAMPLE 4

A membrane as in Example 1 was embossed to improve physical properties. An expanded steel flattened mesh was pressed against the wet membrane to produce weld lines (5 seconds at 380° C.) covering 40% of the surface. The bubbling pressure was >200 mbar and resistivity was 2.5 millimeters.

EXAMPLE 5

A membrane as in Example 1 was bonded to a second similar membrane with their machine directions arranged perpendicularly. The wet membranes were bonded using a steel mesh as in (4). The bubbling pressure was again >200 mbar but the resistivity was 5 mm.

EXAMPLE 6

A membrane was prepared by bonding two pieces of PEEK/UDEL film together in perpendicular directions before extraction. The films were pressed between aluminium foil at 380° C. and 20 tons for 30 seconds. The resulting membrane (0.17 mm thick) had tensile strengths of 3.3 and 3.6 MPa in the two perpendicular directions. A resistivity value of 4 mm was found.

I claim:

1. A method of making a polyaryletherketone porous membrane, comprising the steps of:
   (a) providing a mixture of a first polymeric material, which is a polyaryletherketone, and a second polymeric material, which is partially incompatible with said first polymeric material;
   (b) forming said mixture into a film; and
   (c) extracting from said film at least a substantial portion of said second polymeric material by means of a liquid which does not dissolve said first polymeric material.

2. A method as claimed in claim 1, in which at least 80 percent by weight of said second polymeric material is extracted.

3. A method as claimed in claim 1, in which the proportion by weight in said mixture of said first polymeric material to said second polymeric material is between 45:55 and 70:30.

4. A method as claimed in claim 1, further comprising the step of drying said film after said extracting step.

5. A method as claimed in claim 4, wherein said drying step is performed in the presence of a surfactant.

6. A method as claimed in claim 1, wherein said second polymeric material is an aromatic polymer.

7. A method as claimed in claim 6, wherein said second polymeric material comprises an aromatic sulfone or aromatic ether sulfone polymer.

8. A method as claimed in claim 1, wherein said first polymeric material has a repeat unit selected from the group consisting of:

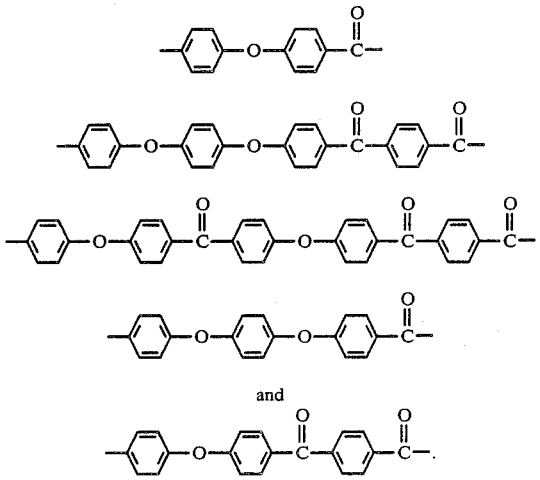

* * * * *